(12) United States Patent
Yu et al.

(10) Patent No.: US 8,940,656 B2
(45) Date of Patent: Jan. 27, 2015

(54) COP₂ LOADED RED PHOSPHORUS, PREPARATION AND USE OF THE SAME

(71) Applicant: The Chinese University of Hong Kong, Hong Kong (CN)

(72) Inventors: Chai Mei Jimmy Yu, Hong Kong (CN); Feng Wang, Meng Cheng County (CN)

(73) Assignee: The Chinese University of Hong Kong, Hong Kong (CN)

(*) Notice: Subject to any disclaimer, the term of this patent is extended or adjusted under 35 U.S.C. 154(b) by 0 days.

(21) Appl. No.: 14/023,853

(22) Filed: Sep. 11, 2013

(65) Prior Publication Data

US 2014/0069801 A1 Mar. 13, 2014

Related U.S. Application Data

(60) Provisional application No. 61/700,751, filed on Sep. 13, 2012.

(51) Int. Cl.

| | | |
|---|---|---|
| B01J 27/00 | (2006.01) |
| B01J 27/185 | (2006.01) |
| H01B 1/02 | (2006.01) |
| H01B 1/06 | (2006.01) |
| C01B 3/00 | (2006.01) |
| C01B 3/02 | (2006.01) |
| C01B 3/08 | (2006.01) |
| C01B 4/00 | (2006.01) |
| C01B 6/00 | (2006.01) |
| C01B 6/24 | (2006.01) |
| C01B 3/04 | (2006.01) |
| B01J 37/06 | (2006.01) |
| B01J 37/10 | (2006.01) |
| B01J 35/00 | (2006.01) |
| B01J 37/02 | (2006.01) |

(52) U.S. Cl.
CPC ............. *B01J 27/1853* (2013.01); *C01B 3/042* (2013.01); *B01J 37/06* (2013.01); *B01J 37/10* (2013.01); *B01J 35/002* (2013.01); *B01J 35/004* (2013.01); *B01J 37/0201* (2013.01); *C01B 3/00* (2013.01); *Y02E 60/364* (2013.01)
USPC ..... 502/208; 502/213; 252/521.2; 252/521.5; 423/644; 423/648.1; 423/657; 204/157.52

(58) Field of Classification Search
USPC .................... 502/208, 213; 252/521.2, 521.5; 423/644, 648.1, 657; 204/157.52
See application file for complete search history.

(56) References Cited

U.S. PATENT DOCUMENTS

| | | | | |
|---|---|---|---|---|
| 3,088,807 | A | * | 5/1963 | Forrest .......................... 423/299 |
| 3,279,891 | A | * | 10/1966 | Fritz Wenzel ................. 422/199 |
| 4,145,314 | A | * | 3/1979 | Fung et al. ...................... 502/74 |
| 4,463,104 | A | * | 7/1984 | Antos et al. ................... 502/213 |
| 5,571,526 | A | * | 11/1996 | Miyata ........................ 423/594.1 |
| 5,880,067 | A | * | 3/1999 | Linkous ......................... 504/151 |
| 6,903,048 | B2 | * | 6/2005 | Iwata et al. ................... 502/213 |
| 7,446,075 | B1 | | 11/2008 | Kolev |
| 8,288,455 | B1 | * | 10/2012 | Miller ........................... 523/218 |

FOREIGN PATENT DOCUMENTS

| | | | |
|---|---|---|---|
| CN | 101659403 A | 3/2010 | |
| CN | 102029169 A | 4/2011 | |
| CN | 102463126 A | 5/2012 | |
| WO | 2014/040372 | * 3/2014 | ............... B01J 27/18 |

OTHER PUBLICATIONS

"Stability and electronic structure of the Co-P compounds on first-principle calculations," Zhenhua Yang et al. Journal of Alloys and Compounds 509 (2011), pp. 165-171.*
"Red phosphorus: An elemental photocatalyst for hydrogen formation from water," Feng Wang et al. Applied Catalysis B: Environmental 111-112 (2012), pp. 409-414.*
"Identification of a new cobalt phosphide phase as a precipitate in LEC single crystal InP," N. A. Smith et al. Journal of Crystal Growth, vol. 69, Issues 2-3 (Nov. 2, 1984), pp. 269-274.*
"Urchin-like Co2P nanocrystals: Synthesis, characterization, influencing factors and photocatalytic degradation property," Yonghong Ni et al. Materials Research Bulletin 44 (2009), pp. 1166-1172.*
"Hydrothermal synthesis of cobalt phosphide nanoparticles," He Huang et al. Ceramics International 38 (2012), pp. 1713-1715.*
"MOCVD Growth and Characterization of Cobalt Phosphide Thin Films on InP Substrates," Davide Barreca et al. Journal of the Electrochemical Society, 151 (9), pp. G638-G641 (2004).*
Huang et al., "Hydrothermal synthesis of cobalt phosphide nanoparticles," *Ceramics International* 38:1713-1715, 2012.
International Search Report, mailed Dec. 19, 2013, for International Application No. PCT/CN2013/001055, 5 pages.
Jeitschko et al., "Ambient Pressure Synthesis, Properties, and Structure Refinements of VP₄ and CoP₂," *Journal of Solid State Chemistry* 52:320-326, 1984.
Ni et al., "Urchin-like Co₂P nanocrystals: Synthesis, characterization, influencing factors and photocatalytic degradation property," *Materials Research Bulletin* 44:1166-1172, 2009.
Wang et al., "Red phosphorus: An elemental photocatalyst for hydrogen formation from water," *Applied Catalysis B: Environmental* 111-112:409-414, 2012.

* cited by examiner

*Primary Examiner* — Patricia L Hailey
(74) *Attorney, Agent, or Firm* — Seed IP Law Group PLLC

(57) ABSTRACT

Disclosed are a photocatalyst of CoP₂ loaded red phosphorus, a preparation method thereof, and a method for photocatalytic hydrogen production from water under visible light irradiation over the photocatalyst of CoP₂ loaded red phosphorus.

6 Claims, 1 Drawing Sheet

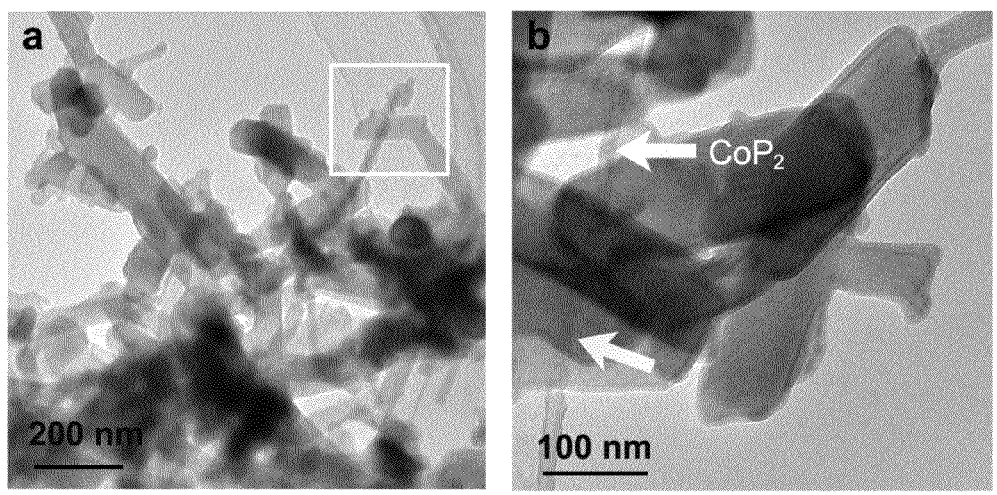

COP₂ LOADED RED PHOSPHORUS, PREPARATION AND USE OF THE SAME

CROSS-REFERENCE TO RELATED APPLICATIONS

This application claims the benefits of U.S. Provisional Patent Application No. 61/700,751 as filed on Sep. 13, 2012. The disclosure of the provisional application is incorporated herein by reference in its entirety.

TECHNICAL FIELD

The present application relates to a photocatalyst, a preparation method and a use thereof.

TECHNICAL BACKGROUND

Hydrogen is an important industrial raw material and a special gas having reducibility in petrochemical and fine organic synthesis industries. It is also used in aerospace and viewed as the energy source of the future, due to its high combustion enthalpy (−286 kJ/mol). Currently, the technologies for hydrogen production are mainly steam reforming from hydrocarbons, electrolysis and thermolysis. Hydrogen-gas as a fuel to drive vehicles such as buses, cars and the like is not used very often because the technique necessary to generate energy out of hydrogen is very expensive.

Solar-induced photocatalytic hydrogen production from water is a clean and renewable source of energy, and has been considered as a promising way to alleviate this problem. Under irradiation, photogenerated electrons from a photocatalyst could reduce water to hydrogen. This technology is an environmentally friendly process and promising to produce hydrogen in a low cost. Besides, hydrogen can be produced in situ and does not need to be transported.

However, the efficiency and the application of photocatalytic hydrogen production are limited by the narrow absorption of semiconductor and the need of expensive co-catalyst, such as Pt. Even though great efforts have been made to develop new photocatalysts and co-catalysts, these problems still could not be solved. Accordingly, a novel and desirable photocatalyst with a suitable conduction band energy for transferring photogenerated electrons to water is needed.

SUMMARY

In one aspect, the present application provides a photocatalyst of $CoP_2$ loaded red phosphorus.

In another aspect, the present application provides a method for preparing a photocatalyst of $CoP_2$ loaded red phosphorus, comprising:
 a) growing $CoP_2$ from a red phosphorus in water; and
 b) treating the $CoP_2$ loaded red phosphorus at a temperature ranging from 450° C. to 650° C.

In another aspect, the present application provides a method for photocatalytically producing hydrogen from water in the presence of a sacrificial agent over a photocatalyst of $CoP_2$ loaded red phosphorus.

In another aspect, the present application provides a use of $CoP_2$ as a co-catalyst for a red phosphorus.

$CoP_2$ loaded red phosphorus as provided in the present application is a photocatalyst with broad visible light absorption and high photocatalytic efficiency for hydrogen production from water. The absorption band edge of red phosphorus can be up to 700 nm, which can be driven by visible light. When used for hydrogen production from water, the performance of $CoP_2$ can be up to 6 times higher compared with the common co-catalyst of Pt under the same conditions. Moreover, as a non-noble metal co-catalyst, the price of $CoP_2$ is about 200 times lower than that of Pt.

BRIEF DESCRIPTION OF THE DRAWINGS

FIG. 1a shows TEM image of $CoP_2$ loaded red phosphorus prepared in Example 1.

FIG. 1b shows another TEM image of $CoP_2$ loaded red phosphorus prepared in Example 1.

DETAILED DESCRIPTION

In the following description, certain specific details are included to provide a thorough understanding of various disclosed embodiments. One skilled in the relevant art, however, will recognize that embodiments may be practiced without one or more of these specific details, or with other methods, components, materials, etc.

Unless the context requires otherwise, throughout the specification and claims which follow, the word "comprise" and variations thereof, such as, "comprises" and "comprising" are to be construed in an open, inclusive sense, which is as "including, but not limited to".

Reference throughout this specification to "one embodiment", or "an embodiment", or "in another embodiment", or "some embodiments", or "in some embodiments" means that a particular referent feature, structure, or characteristic described in connection with the embodiment is included in at least one embodiment. Thus, the appearance of the phrases "in one embodiment", or "in an embodiment", or "in another embodiment", or "in some embodiments" in various places throughout this specification are not necessarily all referring to the same embodiment. Furthermore, the particular features, structures, or characteristics may be combined in any suitable manner in one or more embodiments.

It should be noted that, as used in this specification and the appended claims, the singular forms "a", "an", and "the" include plural referents unless the content clearly dictates otherwise. In this application, the use of "or" means "and/or" unless stated otherwise.

In one aspect, the present application provides a photocatalyst of $CoP_2$ loaded red phosphorus.

In some embodiments of the present application, $CoP_2$ is loaded at about 0.5% to about 7.0% by weight, preferably about 1.0% to about 4.0% by weight, more preferably about 2.0% to about 4.0% by weight, most preferably about 2.0% by weight.

In some embodiments of the present application, the red phosphorus contained in the photocatalyst preferably is a crystalline red phosphorus.

In some embodiments of the present application, the $CoP_2$ loaded red phosphorus has photocatalytic activity and can be used for hydrogen production from water.

In another aspect, the present application provides a method for preparing a photocatalyst of $CoP_2$ loaded red phosphorus, comprising:
 a) growing $CoP_2$ from a red phosphorus in water; and
 b) treating the $CoP_2$ loaded red phosphorus at a temperature ranging from about 450° C. to about 650° C., preferably about 450° C. to about 500° C., more preferably about 450° C.

In some embodiments of the present application, the step of growing $CoP_2$ from a red phosphorus is carried out by the hydrothermal reaction of a cobalt compound with a red phosphorus.

In some embodiments of the present application, the hydrothermal reaction of the cobalt compound with the red phosphorus can be carried out at a temperature ranging from 150° C. to 200° C. for 12-24 hours, preferably about 200° C. for about 12-20 hours, more preferably about 200° C. for about 12 hours.

In some embodiments of the present application, the cobalt compound that can be used includes but is not limited to cobalt acetate, cobalt chloride, potassium cobalt cyanide, and a combination thereof.

In some embodiments of the present application, the red phosphorus used in step a) is an amorphous red phosphorus.

In some embodiments of the present application, the molar ratio of the red phosphorus to the cobalt compound used in step a) can be 50-2000:1, preferably 100-600:1, more preferably 400-600:1.

In some embodiments of the present application, a molar concentration of the red phosphorus in water in step a) can be 0.1-1 M, preferably 0.2-0.4 M.

In some embodiments of the present application, $CoP_2$ loaded red phosphorus in step b) can be thermally treated at a temperature ranging from about 450° C. to about 650° C. for about 2 hours-about 15 hours, preferably at about 450° C. to about 500° C. for about 2 hours-about 15 hours, more preferably at a temperature of about 450° C. for about 5 hours-about 12 hours.

In some embodiments of the present application, $CoP_2$ loaded red phosphorus in step b) can be thermally treated under vacuum.

In some embodiments of the present application, the method for preparing the photocatalyst of $CoP_2$ loaded red phosphorus further comprises a step of purifying the red phosphorus before growing $CoP_2$ from the red phosphorus in water.

In some embodiments of the present application, the red phosphorus is purified in water by the hydrothermal method at a temperature of about 200° C. Specifically, the step of purifying the red phosphorus comprises dispersing a commercially available red phosphorus in water to obtain a suspension, heating the resulting suspension to about 200° C. and maintaining at the same temperature for about 12 hours to remove surface oxidation.

In another aspect, the present application provides a method for photocatalytically producing hydrogen from water in the presence of a sacrificial agent over a photocatalyst of $CoP_2$ loaded red phosphorus.

The photo-induced hydrogen production from water over the photocatalyst of $CoP_2$ loaded red phosphorus is evaluated below. In order to increase the efficiency of photogenerated electrons and hydrogen formation, it is preferable to add a hole sacrificial agent during the formation of hydrogen to aid the separation of photogenerated electrons and holes.

Accordingly, in some embodiments of the present application, the sacrificial agent that can be used includes but is not limited to methanol, citric acid, ascorbic acid, lactic acid and a mixture thereof, preferably methanol, ascorbic acid and lactic acid, more preferably ascorbic acid and lactic acid, most preferably lactic acid.

In some embodiments of the present application, the sacrificial agent can be used at such amount that the concentration of the sacrificial agent in water is about 1% to about 15%, preferably about 3% to about 10%, more preferably about 5%. Where the used sacrificial agent is solid, such as citric acid, ascorbic acid and the like, the above concentration unit is weight percentage. Where the used sacrificial agent is liquid, such as methanol, lactic acid and the like, the above concentration unit is volume percentage.

In some embodiments of the present application, the photocatalyst of $CoP_2$ loaded red phosphorus can be used at a catalytic amount, which can be determined by a person skilled in the art through conventional techniques in the art.

In some embodiments of the present application, the hydrogen production from water can be carried out under visible light irradiation. The visible light is in the range of from 400 nm to 750 nm.

Briefly, the present application provides the method for photocatalytically producing hydrogen from water comprising
 a) mixing the photocatalyst of $CoP_2$ loaded red phosphorus, the sacrificial agent and water; and
 b) irradiating a mixture obtained from step a) with a visible light.

In some embodiments of the present application, the above-mentioned mixing step can be carried out by adding the photocatalyst of $CoP_2$ loaded red phosphorus and the sacrificial agent to water or adding the photocatalyst of $CoP_2$ loaded red phosphorus to a solution of the sacrificial agent in water or adding the sacrificial agent to a suspension of the photocatalyst of $CoP_2$ loaded red phosphorus in water In another aspect, the present application provides a use of $CoP_2$ as a co-catalyst for red phosphorus. When used for hydrogen production from water, the optimal performance of $CoP_2$ as the co-catalyst is 6 times higher than that of the common co-catalyst, Pt.

The $CoP_2$ loaded red phosphorus is also characterized by X-ray diffraction (XRD), transmission electron microscopy (TEM) and UV-Vis spectrophotometer, respectively, in which XRD is performed with a Rigaku SmartLab X-ray diffractometer using Cu Kα irradiation ($\lambda$=1.5406 Å); transmission electron microscopy images were recorded using a CM-120 microscope (Philips, 120 kV) coupled with an energy-dispersive X-ray (EDX) spectrometer (Oxford Instrument); the electron microscopy samples were prepared by dispersing the powder in ethanol with ultrasonication for 20 s; and UV-vis diffuse reflectance spectra were achieved using a UV-vis spectrophotometers (Cary 100 scan spectrophotometers, Varian). FIGS. 1a and 1b show TEM images of $CoP_2$ loaded red P prepared according to the present application.

EXAMPLES

Embodiments of the present application are disclosed in further detail in the following examples, which are not in any way intended to limit the scope of the present invention.

Example 1

Preparation of $CoP_2$ Loaded Red Phosphorus 100 mg of commercially available red phosphorus was dispersed in 15 ml of de-ionized water to form a suspension. The resulted suspension was put into a Teflon-lined stainless autoclave, heated to 200° C. and maintained at 200° C. for 12 h to remove surface oxidation. 1 mg of Cobalt (II) acetate tetrahydrate (purity >99.999%, available from Sigma-Aldrich without further purification) was added into 15 mL of de-ionized water together with 100 mg of purified red phosphorus. After ultrasonic treatment for 5 min, the resulted mixture was transferred into a preheated oven at 200° C. and maintained at the same temperature for 20 h. After the hydrothermal reaction, the reaction mixture is filtrated and the resulted powders were washed with 8 ml of de-ionized water and 8 ml of ethanol for three times, separately. The washed powders were dried at 60° C. The dried powders were crystallized in a vacuum tube furnace at 450° C. for 12 h. The crystallized products were washed with 8 ml of water and 8 ml of ethanol, and then dried at 60° C. to obtain the photocatalyst of $CoP_2$ loaded crystalline red phosphorus.

Example 2

Photocatalytic Hydrogen Production From Water Over $CoP_2$ Loaded Red Phosphorus The photocatalytic $H_2$ evolution experiment was carried out in a Pyrex reaction cell connected to a closed gas circulation and evacuation system. 50 mg of the $CoP_2$ loaded red phosphorus as prepared in Example 1 was dispersed in 100 mL of 5 Vol % of aqueous solution of lactic acid as a hole sacrificial agent. The resulted suspension was purged with argon to remove dissolved air before irradiation. The resulted suspension was irradiated by a 300 W xenon lamp with an appropriate cut-off filter and a water filter. The amount of hydrogen generated from photocatalytic water splitting was measured by Techcomp GC7900 gas chromatography with a TCD detector and a capillary column (Molecular Sieve 5 Å). High purity nitrogen gas was used as a carrier gas.

Example 3

Effect of Loading Amount of $CoP_2$ on Hydrogen Production $CoP_2$ loaded red phosphorus was prepared in the same manner as in Example 1 with the exception of different amounts of cobalt (II) acetate tetrahydrate. 1 mg, 2 mg, 4 mg, 6 mg, and 8 mg of cobalt (II) acetate tetrahydrate were used to prepare the $CoP_2$ loaded red phosphorus having different weight percentage of $CoP_2$, respectively. The photocatalytic $H_2$ evolution experiments were carried out under the same conditions as in Example 2 with the exception of $CoP_2$ loaded red phosphorus having different weight percentage of $CoP_2$. The rates of hydrogen production in the presence of different percentages of $CoP_2$ with 5 vol % of aqueous solution of lactic acid as the sacrificial agent were shown in Table 1.

TABLE 1

Detailed conditions for synthesis in the presence of different percentages of $CoP_2$

| Sample | Red P (mg) | $Co(acac)_2 \cdot 4H_2O$ (mg) | $H_2O$ (mL) | Temperature (° C.) | Percentages of $CoP_2$ (wt %) | The rate of $H_2$ production ($\mu mol\ h^{-1}\ g^{-1}$) |
|---|---|---|---|---|---|---|
| S0 | 100 | 0 | 15 | 200 | 0 | 2.7 |
| S1 | 100 | 1 | 15 | 200 | 0.5 | 54.1 |
| S2 | 100 | 2 | 15 | 200 | 1.0 | 88.0 |
| S3 | 100 | 4 | 15 | 200 | 2.0 | 203.0 |
| S4 | 100 | 6 | 15 | 200 | 3.0 | 174.1 |
| S5 | 100 | 8 | 15 | 200 | 4.0 | 147.0 |

The above results show that the photocatalytic activity of 0.5 wt % $CoP_2$ loaded red P is 20 times as much as that of red P, and the photocatalytic activity of 2.0 wt % $CoP_2$ loaded red P is 75 times as much as that of red P.

Example 4

Effect of Amount of Sacrificial Agent on Hydrogen Production 2 wt % $CoP_2$ loaded red phosphorus was prepared in the same manner as in Example 1. The photocatalytic $H_2$ evolution experiments were carried out under the same conditions as in Example 2 with the exception of different volume percentages of lactic acid. The rates of hydrogen production in the presence of different volume percentages of lactic acid were shown in Table 2.

TABLE 2

Comparison of the rate of hydrogen production from water with different volume percentages of lactic acid over 2 wt % $CoP_2$ loaded red phosphorus.

| Lactic acid (vol %) | 0 | 1 | 3 | 5 | 8 | 10 |
|---|---|---|---|---|---|---|
| The rate of $H_2$ production ($\mu mol\ h^{-1}\ g^{-1}$) | 29.1 | 67.3 | 133.7 | 203.0 | 210.7 | 215.2 |

Example 5

Effect of Different Sacrificial Agent on Hydrogen Production 2 wt % $CoP_2$ loaded red phosphorus was prepared in the same manner as in Example 1. The photocatalytic $H_2$ evolution experiments were carried out under the same conditions as in Example 2 with the exception of different sacrificial agents. The rates of hydrogen production in the presence of different sacrificial agents were shown in Table 3.

TABLE 3

Comparison of the rate of hydrogen production from water with different sacrificial agents over 2 wt % $CoP_2$ loaded red phosphorus

| Sacrificial agents (5%)[a] | Methanol | Ascorbic acid | Lactic acid | Citric acid |
|---|---|---|---|---|
| The rate of $H_2$ production ($\mu mol\ h^{-1}\ g^{-1}$) | 120.3 | 181.1 | 203.0 | 100.5 |

[a]For methanol and lactic acid, the unit is volume percentage, for ascorbic acid and citric acid, the unit is weight percentage.

Example 6

Comparison Between $CoP_2$ and Pt as Co-Catalysts $CoP_2$ loaded red phosphorus was prepared in the same manner as in Example 1. The photocatalytic $H_2$ evolution experiments were carried out under the same conditions as in Example 2 with the exception of $CoP_2$ loaded red phosphorus having different percentages of $CoP_2$ and Pt loaded red phosphorus having different percentages of Pt. The rates of hydrogen production in the presence of $CoP_2$ or Pt as a co-catalyst with different percentages were shown in Table 4.

TABLE 4

Comparison of the rate of hydrogen production between $CoP_2$ and Pt as the co-catalyst with different percentages in the presence of 5 vol % of aqueous solution of lactic acid as the sacrificial agent.

| | wt % | | | | | | | | | |
|---|---|---|---|---|---|---|---|---|---|---|
| | 0.5 | | 1 | | 2 | | 3 | | 4 | |
| | $CoP_2$ | Pt | $CoP_2$ | Pt | $CoP_2$ | Pt | $CoP_2$ | Pt | $CoP_2$ | Pt |
| $H_2{}^a$ | 54.0 | 17.6 | 88.0 | 33.2 | 203.0 | 30.0 | 174.1 | 28.5 | 147.0 | 26.3 |

$^a$The rate of $H_2$ production ($\mu$mol h$^{-1}$ g$^{-1}$)

The above results show that the optimal performance of $CoP_2$ as a co-catalyst is even higher than that of Pt by a factor of 6. Without bound by any theory, this enhanced photocatalytic activity may be attributed to the coordination effect between Co atoms of $CoP_2$ with water. This interaction would decrease the bond strength of O—H, and thus $H_2O$ would be more easily decomposed after accepting the photogenerated electrons.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A photocatalyst of $CoP_2$ loaded red phosphorus.

2. The photocatalyst of claim 1, wherein $CoP_2$ is loaded onto the red phosphorus at about 0.5% to about 7.0% by weight.

3. The photocatalyst of claim 2, wherein $CoP_2$ is loaded onto the red phosphorus at about 1.0% to about 4.0% by weight.

4. The photocatalyst of claim 2, wherein $CoP_2$ is loaded onto the red phosphorus at about 2.0% to about 4.0% by weight.

5. The photocatalyst of claim 2, wherein $CoP_2$ is loaded onto the red phosphorus at about 2.0% by weight.

6. The photocatalyst of claim 1, wherein the red phosphorus contained therein is a crystalline red phosphorus.

* * * * *